(12) United States Patent
Grant

(10) Patent No.: US 10,853,310 B2
(45) Date of Patent: Dec. 1, 2020

(54) CALL STACK SAMPLING

(71) Applicant: Arm Limited, Cambridge (GB)

(72) Inventor: Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 16/292,596

(22) Filed: Mar. 5, 2019

(65) Prior Publication Data

US 2020/0285606 A1 Sep. 10, 2020

(51) Int. Cl.
*G06F 15/82* (2006.01)
*G06F 9/32* (2018.01)
*G06F 9/30* (2018.01)

(52) U.S. Cl.
CPC .............. *G06F 15/82* (2013.01); *G06F 9/322* (2013.01); *G06F 9/30163* (2013.01)

(58) Field of Classification Search
CPC ....... G06F 15/82; G06F 9/322; G06F 9/30163
See application file for complete search history.

(56) References Cited

U.S. PATENT DOCUMENTS

| 6,598,012 B1 | 7/2003 | Berry et al. |
| 2004/0148594 A1 | 7/2004 | Williams |
| 2007/0038810 A1* | 2/2007 | Rosen ................. G06F 12/0875 711/132 |
| 2008/0209406 A1* | 8/2008 | O'Callahan ......... G06F 11/3476 717/131 |
| 2019/0065199 A1* | 2/2019 | Robinson ............ G06F 9/30112 |

OTHER PUBLICATIONS

International Search Report and Written Opinion of the International Searching Authority for PCT/GB2020/050510 dated Jun. 8, 2020, 14 pages.

* cited by examiner

*Primary Examiner* — Zachary K Huson
(74) *Attorney, Agent, or Firm* — Nixon & Vanderhye P.C.

(57) ABSTRACT

Apparatuses and methods of their operation are disclosed. A call stack is maintained which comprises subroutine information relating to subroutines which have been called during data processing operations and have not yet returned. A stack pointer is indicative of an extremity of the call stack associated with a most recently called subroutine which has been called during the data processing operations and has not yet returned. Call stack sampling can be carried out with reference to the stack pointer. A tide mark pointer is maintained, which indicates of a value which the stack pointer had when the call stack sampling procedure processing circuitry was last completed. The call stack sampling procedure comprises retrieving subroutine information from the call stack indicated between the value of the tide mark pointer and the current value of the stack pointer. More efficient call stack sampling is thereby supported, in that only modifications to the call stack need be sampled.

20 Claims, 8 Drawing Sheets

| SOURCE | TARGET | STACK POINTER | 125 |
|--------|--------|---------------|-----|
|        |        |               |     |
|        |        |               |     |
|        |        |               |     |
|        |        |               |     |

CALL STACK SAMPLING

TECHNICAL FIELD

The present disclosure relates to data processing. In particular, the present disclosure relates to sampling of the call stack in a data processing apparatus.

DESCRIPTION

Program performance analysis may be carried out by sampling the call stack maintained by a data processing apparatus when it performs its data processing operations. This sampling may for example be performed periodically or in response to a particular event. When a subroutine is called by software a corresponding frame is added to the call stack and when that subroutine returns the frame is removed. Accordingly, the current content of the call stack provides information relating to currently active functions. Software can be arranged to provide information relating to the content of the call stack, but this is disruptive because the software being executed must be interrupted in order for the stack to be "walked", e.g. using frame pointer chains or frame-unwinding metadata. It can also be disruptive to data cache contents. A data processing apparatus may be provided with a hardware call stack buffer, which is a small fixed-size buffer of call stack records updated by call and return instructions. This call stack buffer can be separately sampled, but is of fixed sized, which can be disadvantageous.

SUMMARY

In one example embodiment described herein there is an apparatus comprising: processing circuitry to perform data processing operations, wherein the data processing operations comprise subroutines; call stack storage to store a call stack comprising subroutine information relating to subroutines which have been called during the data processing operations and have not yet returned; stack pointer storage to store a stack pointer, wherein a current value of the stack pointer is indicative of an extremity of the call stack associated with a most recently called subroutine which has been called during the data processing operations and has not yet returned, wherein the processing circuitry is responsive to a call stack sampling trigger to perform a call stack sampling procedure comprising accessing the call stack with reference to the stack pointer, and tide mark pointer storage to store a tide mark pointer, wherein a value of the tide mark pointer is indicative of a previous value which the stack pointer had when the processing circuitry last completed the call stack sampling procedure, wherein the processing circuitry is arranged to perform the call stack sampling procedure comprising retrieving subroutine information indicated between the value of the tide mark pointer and the current value of the stack pointer, wherein the tide mark pointer storage is responsive to performance of the call stack sampling procedure to modify the tide mark pointer to match the current value of the stack pointer, and wherein tide mark pointer storage is responsive to removal of subroutine information from the call stack to modify the tide mark pointer to match the current value of the stack pointer resulting from the removal of subroutine information from the call stack.

In one example embodiment described herein there is a method of data processing comprising: performing data processing operations, wherein the data processing operations comprise subroutines; storing a call stack comprising subroutine information relating to subroutines which have been called during the data processing operations and have not yet returned; storing a stack pointer, wherein a current value of the stack pointer is indicative of an extremity of the call stack associated with a most recently called subroutine which has been called during the data processing operations and has not yet returned; performing a call stack sampling procedure comprising accessing the call stack with reference to the stack pointer in response to a call stack sampling trigger; storing a tide mark pointer, wherein a value of the tide mark pointer is indicative of a previous value which the stack point had when the call stack sampling procedure was last completed; modifying the tide mark pointer to match a modified value of the stack pointer in response to performance of the call stack sampling procedure; and modifying the tide mark pointer to match the current value of the stack pointer resulting from the removal of subroutine information from the call stack, wherein performing the call stack sampling procedure comprises retrieving subroutine information indicated between the value of the tide mark pointer and the current value of the stack pointer.

In one example embodiment described herein there is an apparatus comprising: means for performing data processing operations, wherein the data processing operations comprise subroutines; means for storing a call stack comprising subroutine information relating to subroutines which have been called during the data processing operations and have not yet returned; means for storing a stack pointer, wherein a current value of the stack pointer is indicative of an extremity of the call stack associated with a most recently called subroutine which has been called during the data processing operations and has not yet returned; means for performing a call stack sampling procedure comprising accessing the call stack with reference to the stack pointer in response to a call stack sampling trigger; means for storing a tide mark pointer, wherein a value of the tide mark pointer is indicative of a previous value which the stack point had when the call stack sampling procedure was last completed; means for modifying the tide mark pointer to match a modified value of the stack pointer in response to performance of the call stack sampling procedure; and means for modifying the tide mark pointer to match the current value of the stack pointer resulting from the removal of subroutine information from the call stack, wherein performing the call stack sampling procedure comprises retrieving subroutine information indicated between the value of the tide mark pointer and the current value of the stack pointer.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
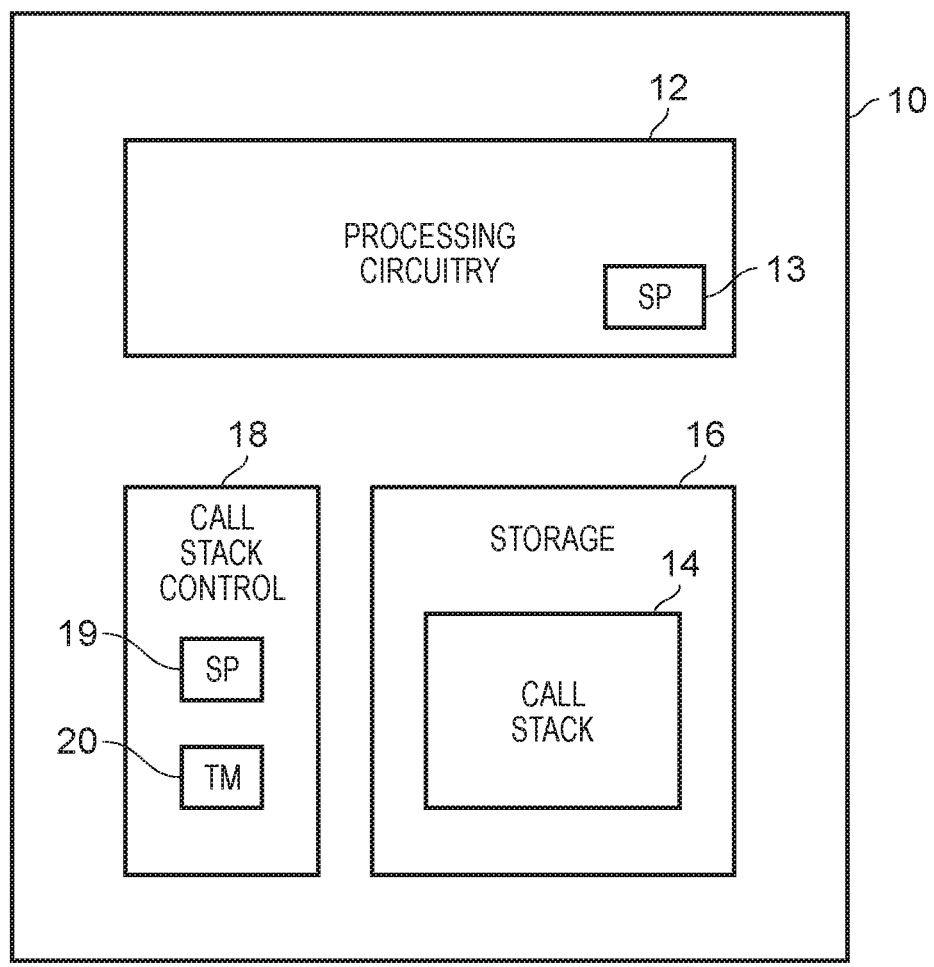
FIG. 1 schematically illustrates an apparatus in one example embodiment.

Before discussing the embodiments with reference to the accompanying figures, the following description of embodiments is provided.

In accordance with one example configuration there is provided an apparatus comprising: processing circuitry to perform data processing operations, wherein the data processing operations comprise subroutines; call stack storage to store a call stack comprising subroutine information relating to subroutines which have been called during the data processing operations and have not yet returned; stack pointer storage to store a stack pointer, wherein a current value of the stack pointer is indicative of an extremity of the call stack associated with a most recently called subroutine which has been called during the data processing operations and has not yet returned, wherein the processing circuitry is responsive to a call stack sampling trigger to perform a call stack sampling procedure comprising accessing the call stack with reference to the stack pointer, and tide mark pointer storage to store a tide mark pointer, wherein a value of the tide mark pointer is indicative of a previous value which the stack pointer had when the processing circuitry last completed the call stack sampling procedure, wherein the processing circuitry is arranged to perform the call stack sampling procedure comprising retrieving subroutine information indicated between the value of the tide mark pointer and the current value of the stack pointer, wherein the tide mark pointer storage is responsive to performance of the call stack sampling procedure to modify the tide mark pointer to match the current value of the stack pointer, and wherein tide mark pointer storage is responsive to removal of subroutine information from the call stack to modify the tide mark pointer to match the current value of the stack pointer resulting from the removal of subroutine information from the call stack.

The provision of a tide mark pointer storage storing a tide mark pointer, where the value of the tide mark pointer shows the value that the stack pointer had when the call stack was last sampled, means that when the call stack sampling is carried out the call stack need only be sampled to a certain "depth", since it is known that the call stack records beyond that point have not changed. Indeed, in the event that the tide mark pointer and the call stack pointer have the same value no call stack sampling needs to be carried out. This may for example prove useful in the case of repeated sampling during a very long running function such as the multiplication of a very large matrix. Once the first sample of the call stack has been made (and the tide mark pointer correspondingly set), the same value of the tide mark pointer will be seen when the call stack sampling is triggered whilst the same function is still running. The same value of the tide mark indicates not only that the sample is in the same function with the same call stack, but furthermore that this is the same instance of the function (i.e. that the function has not returned and been called again in the meantime).

The apparatus may be variously configured in order to maintain the tide mark pointer value in the tide mark pointer storage, but in some embodiments the tide mark pointer storage is responsive to execution of a subroutine return instruction which causes the current value of the stack pointer to correspond to a less recently called subroutine than indicated by the value of the tide mark pointer to modify the tide mark pointer to match the current value of the stack pointer. Similarly, in some embodiments the tide mark pointer storage is responsive to a write to the stack pointer which causes the current value of the stack pointer to correspond to a less recently called subroutine than indicated by the value of the tide mark pointer to modify the tide mark pointer to match the current value of the stack pointer resulting from the write to the stack pointer. Accordingly, this enables the tide mark pointer to be updated not only for "pop" style instructions but also for a return and/or a direct write to the stack pointer, which covers both normal returns and unwinding of the call stack (as part of a call sampling procedure).

The call stack sampling trigger may take a variety of forms, but in some embodiments the call stack sampling trigger is reception of a predetermined call stack sampling interrupt.

The call stack sampling interrupt may be generated in various ways and by a variety of sources, as appropriate to the implementation of the present techniques, but in some embodiments the tide mark pointer storage and the stack pointer storage are arranged to cooperate to generate the predetermined call stack sampling interrupt when the current value of the stack pointer indicates a stack pointer position in the call stack corresponding to a more recently called subroutine than a tide mark position in the call stack indicated by the value of the tide mark pointer. Accordingly, this condition (of the current value of the stack pointer indicating that there is a more recently called subroutine than indicated by the current tide mark position) can be used as a trigger and/or filter on the generation of the call stack sampling interrupt. On the one hand call stack sampling can therefore be initiated when a new function is called and on the other hand call stack sampling can be prevented from happening unless this is the case. In this manner an efficient approach to call stack sampling is supported in which if you only carried out when required.

In some embodiments the sampling of the call stack may be periodic and accordingly the call stack sampling trigger is elapse of a predetermined time period. In example embodiments in which the processing circuitry is software multi-threaded, the tide mark pointer value forms part of the thread context. In consequence, when a thread switch takes places the tide mark pointer value must either be appropriately updated for the new thread context or must be invalidated. Accordingly, in some embodiments the processing circuitry is software multi-threaded and, when performing a thread switch from a first thread to a second thread, is arranged to export thread context for the first thread comprising a first thread value of the tide mark pointer and to import thread context for the second thread comprising a second thread value of the tide mark pointer for the second thread. Alternatively in some embodiments the processing circuitry is software multi-threaded and, when performing a thread switch from a first thread to a second thread, is arranged to invalidate a first thread value of the tide mark pointer and set to a default value a second thread value of the tide mark pointer for the second thread. In some example embodiments the processing circuitry is hardware multi-threaded, wherein the call stack storage is capable of storing a set of per-thread call stacks, wherein the stack pointer storage is capable of storing a set of per-thread stack pointers, and wherein the tide mark pointer storage is capable of storing a set of per-thread tide mark pointers.

In some embodiments the apparatus further comprises: a call stack buffer to store records, each record comprising: a source address and a target address for a subroutine which has been called during the data processing operations and has not yet returned; and a record value of the stack pointer at a timepoint when the record was created; a trace buffer to store trace data for export from the apparatus; and call stack buffer sampling circuitry responsive to a call stack buffer sampling trigger to perform a record copying process comprising copying stored records in the call stack buffer to the trace buffer. The call stack buffer sampling trigger may take a variety of forms but may for example be the call stack sampling trigger. Hence, when the call stack sampling procedure is carried out, the content of the call stack buffer (i.e. the records comprising source address, target address, and stack pointer value) are copied to the trace buffer. This may for example be performed as the first step in response to the call stack sampling trigger, since in some circumstances this call stack buffer content will suffice in terms of sampling the call stack.

In some example embodiments when performing the record copying process the call stack buffer sampling circuitry is responsive to reaching a record for which the record value of the stack pointer indicates a stack pointer position in the call stack corresponding to a less recently called subroutine than a tide mark position in the call stack indicated by the value of the tide mark pointer to conclude the record copying process and to update the tide mark pointer to indicate a most recently called subroutine indicated in the call stack buffer. Accordingly, such embodiments recognise that the full content of the call stack buffer may not need to be copied, where a previous call stack sampling process has sampled the call stack to an extent meaning that this is not required. This situation is recognised with reference to the tide mark position and thus when the stack pointer value of a record is within the region which has already been copied then the copying process can be stopped. Further the tide mark pointer itself can also then be updated to the most recently called record in the call stack buffer, since this formed part of the copied set of records.

In some embodiments when performing the record copying process the call stack buffer sampling circuitry is responsive to reaching an oldest record in the call stack buffer corresponding to a least recently called subroutine having a record in the call stack buffer, when the record value for the oldest record indicates a stack pointer position in the call stack corresponding to a more recently called subroutine than a tide mark position in the call stack indicated by the value of the tide mark pointer, to cause the processing circuitry to perform the call stack sampling procedure. Thus, if the oldest record in the call stack buffer has a stack pointer value which is more recent than the tide mark position indicated by the tide mark pointer, this means that there is a gap between the content of the call stack buffer and the call stack sampling that has previously been carried out. In this situation it is necessary for software to unwind the call stack. Once this is done then an accurate record is gained of the call stack from the most recently called subroutine in the call stack buffer. The tide marker can then be set to the current stack pointer value. In some embodiments the call stack buffer sampling circuitry is arranged to cause the processing circuitry to perform the call stack sampling procedure by issuing a call stack sampling interrupt.

In some embodiments the call stack buffer is responsive to modification of the value of the stack pointer to discard records for which the record value of the stack pointer indicates a stack pointer position in the call stack corresponding to a more recently called subroutine than a stack pointer position in the call stack indicated by the modified value of the stack pointer. Hence updating the stack pointer (e.g. upon a software exception unwind which pops multiple calls) call stack buffer records which have become obsolete due to the modification of the stack pointer value are discarded.

In some embodiments the call stack buffer sampling circuitry is responsive to a new subroutine call, when creation of a new record for the new subroutine call would result in the new record having the record value of the stack pointer indicating a stack pointer position in the call stack corresponding to a more recently called subroutine than the tide mark position in the call stack indicated by the value of the tide mark pointer, to perform the record copying process and to update the value of the tide mark pointer to a current value of the stack pointer. Accordingly this allows content of the call stack buffer to be pre-emptively captured to the trace buffer when pushing a new call onto the call stack buffer would otherwise result in the newest entries stack pointer being newer than the tide mark pointer value. Accordingly, the content of the trace buffer is already up to date and when a subsequent trigger for a call stack sample occurs, the trace buffer already has the required content and there is no need for software intention to unwind the call stack.

In some embodiments the call stack buffer sampling circuitry is arranged to perform the record copying process further dependent on a predefined call stack buffer copying timing interval. Accordingly this prevents excessive copying which could otherwise occur when frequent function calls, e.g. in heavily nested program code.

In some embodiments the trace buffer is responsive to a trace buffer overwrite, wherein the trace buffer overwrite causes unexported trace data to be overwritten, to cause the value of the tide mark pointer to be set to correspond to a stack pointer position indicative of an oldest position in the call stack. Thus where the previously copied call stack information in the trace buffer is lost, modification of the tide mark pointer to the oldest position in the call stack means that the above discussed mechanisms will then cause a complete stack unwind to be carried out. Similarly in some example embodiments the trace buffer is responsive to a trace buffer overwrite, wherein the trace buffer overwrite causes unexported trace data to be overwritten, to cause the tide mark pointer to be invalidated. This has the same effect, namely that the next call stack sampling trigger will cause a full call stack unwind to be performed.

In accordance with once example configuration there is provided a method of data processing comprising: performing data processing operations, wherein the data processing operations comprise subroutines; storing a call stack comprising subroutine information relating to subroutines which have been called during the data processing operations and have not yet returned; storing a stack pointer, wherein a current value of the stack pointer is indicative of an extremity of the call stack associated with a most recently called subroutine which has been called during the data processing operations and has not yet returned; performing a call stack sampling procedure comprising accessing the call stack with reference to the stack pointer in response to a call stack sampling trigger; storing a tide mark pointer, wherein a value of the tide mark pointer is indicative of a previous value which the stack point had when the call stack sampling procedure was last completed; modifying the tide mark pointer to match a modified value of the stack pointer in response to performance of the call stack sampling procedure; and modifying the tide mark pointer to match the current value of the stack pointer resulting from the removal of subroutine information from the call stack, wherein performing the call stack sampling procedure comprises retrieving subroutine information indicated between the value of the tide mark pointer and the current value of the stack pointer.

In accordance with one example configuration there is provided an apparatus comprising: means for performing data processing operations, wherein the data processing operations comprise subroutines; means for storing a call stack comprising subroutine information relating to subroutines which have been called during the data processing operations and have not yet returned; means for storing a stack pointer, wherein a current value of the stack pointer is indicative of an extremity of the call stack associated with a most recently called subroutine which has been called during the data processing operations and has not yet returned; means for performing a call stack sampling procedure comprising accessing the call stack with reference to the stack pointer in response to a call stack sampling trigger; means for storing a tide mark pointer, wherein a value of the tide mark pointer is indicative of a previous value which the stack point had when the call stack sampling procedure was last completed; means for modifying the tide mark pointer to match a modified value of the stack pointer in response to performance of the call stack sampling procedure; and means for modifying the tide mark pointer to match the current value of the stack pointer resulting from the removal of subroutine information from the call stack, wherein performing the call stack sampling procedure comprises retrieving subroutine information indicated between the value of the tide mark pointer and the current value of the stack pointer.

Particular embodiments will now be described with reference to the figures.

FIG. 1 schematically illustrates a data processing apparatus 10 in one example embodiment. The apparatus comprises processing circuitry 12 which performs data processing operations. In performing these data processing operations, in particular the execution of program instructions, a call stack 14 is maintained. The call stack 14 is schematically shown as being stored in the (data) storage 16. As is known to one of ordinary skill in the art, a call stack is a data structure to which return functions are added corresponding to active functions in the software executed by the processing circuitry 12. Accordingly, when a function or subroutine is called within the software a return instruction is pushed onto the call stack 14 and when that function or subroutine concludes, the return address is popped off the call stack 14 to enable the processing circuitry to return to the correct point in the program instructions to continue their execution. The processing circuitry maintains a stack pointer value 13, for example in a locally accessible register, where the value of the stack pointer indicates the "top" of the stack (in the sense of a growing, ascending stack). The apparatus 10 further comprises call stack control circuitry 18 which also maintains a copy of the stack pointer value 19 and further maintains a tide mark pointer 20. The data processing operations of the processing circuitry 12 can be temporarily interrupted for it to perform a call stack sampling procedure, wherein the call stack 14 is sampled and the content thereof may for example be exported for a programmer to examine. Such sampling of the call stack, either periodically or in response to a particular event, can be useful for program performance analysis. For example, top levels of the stack show the currently active functions, whilst deeper levels can indicate what subsystems are active, for example phases and modules.

When performing the call stack sampling procedure the processing circuitry makes reference to the stack pointer in order to identify the most recently added part of the call stack and also makes reference to the tide mark pointer maintained by the call stack control 18 in order to determine a limit of the call stack sampling which it performs. In other words, the call stack sampling procedure retrieves the information pushed onto the call stack 14 which is to be found between the value of the stack pointer and the tide mark pointer. The manner in which the value of the tide mark pointer is maintained will be described in more detail below with reference to the figures which follow.

Figure 2A:
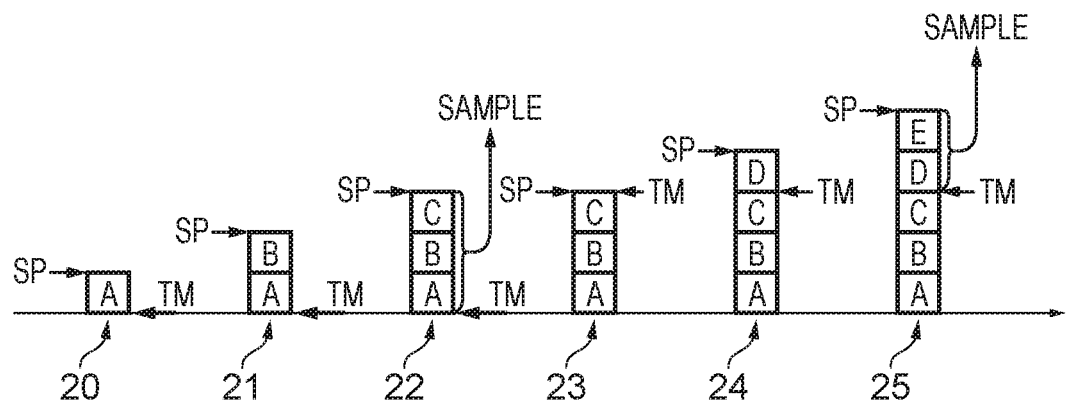
FIGS. 2A and 2B illustrate the evolution of a call stack which is sampled according to respective example embodiments.
Figure 2B:
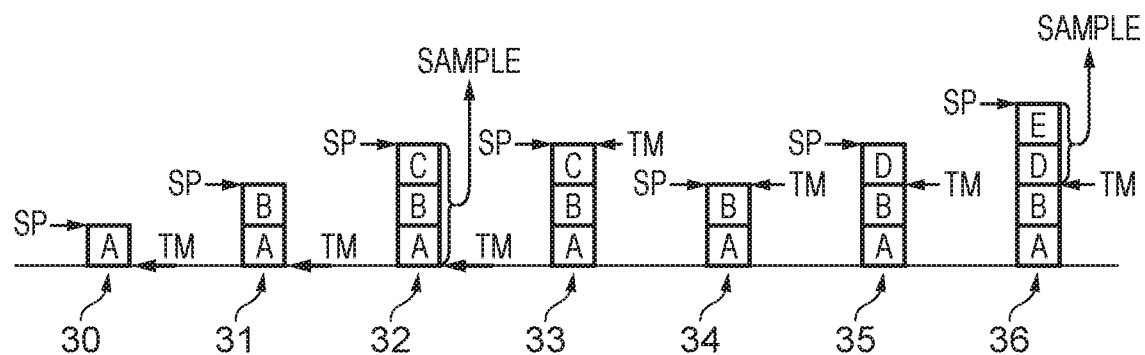

FIGS. 2A and 2B illustrate the evolution of the content of the call stack in respective examples where functions are called by software, causing corresponding return addresses to be pushed onto the call stack. The return addresses are typically part of a "stack frame" corresponding to the function (subroutine) called, but which has not yet terminated with a return. The frame may comprise additional information relating to the calling of this function or subroutine, but this is not significant to the present discussion. FIG. 2A begins at 20 where the call stack comprises stack frame A, indicating that subroutine A has been called, but not yet returned. Accordingly, the value of the stack pointer SP indicates the top of this frame. It will be noted that the convention is adopted throughout this description of a call stack which grows upwards, but also that this is an arbitrary choice of representation. At this point the tide mark pointer TM is at its default or "zero level" value (or indeed may currently simply be invalid), indicating that no sampling of the call stack has yet taken place. Next, at 21, a further subroutine B has been called, causing a stack frame B to be pushed onto the top of the call stack. SP has been updated to indicate the new top of the call stack and TM remains at the zero level. Similarly at 22 a further subroutine C has been called, causing a further stack frame C to be pushed onto the call stack. SP indicates the top of the stack and TM the bottom. Whilst in this state, the software is interrupted to sample the call stack, and hence stack frames C, B, and A (preceding downwards through the stack) are sampled for export and separate analysis. Once the call stack sampling is complete the tide mark pointer TM is updated to match the current value of the stack pointer and hence as shown in 23 in FIG. 2A both SP and TM now point to the top of the call stack. Subsequently a further subroutine D is called, and as a result, as shown at 24, a further stack frame D is pushed onto the call stack. SP continues to indicate the top of the stack, but note that the tide mark pointer TM remains at the level it was set at following the sampling. A further subroutine E is called and at 25 it is shown that the corresponding stack frame E has been pushed onto the call stack. At this point the software is again interrupted to perform call stack sampling and now the sampling only comprises copying stack frames D and E, i.e. the call stack content between the SP and TM pointers, since the position of the TM pointer shows that further sampling below this point in the call stack is not necessary since that part has not changed since the last call stack sample was performed.

FIG. 2B shows a variant on the evolution shown in FIG. 2A. Indeed, the evolution from 30 to 33 is identical to the evolution from 20 to 23 and is not described again here. Between 33 and 34 in FIG. 2B the subroutine C returns, causing the stack frame C to be popped from the call stack. In association with this popping, both the stack pointer SP and the tide mark pointer TM are updated to correspond to the new state of the call stack. Subsequently, a new subroutine D is called and at 35 this is shown by the stack frame D having been pushed onto the call stack and thereafter a further subroutine E is called, as shown at 36 with stack frame E pushed onto the call stack. Thus, with the call stack having the state shown at 36 in FIG. 2B, when the software is interrupted to perform the call stack sampling procedure the sampling only copies the content of the call stack between SP and TM (i.e. frames E and D).

Figure 3:
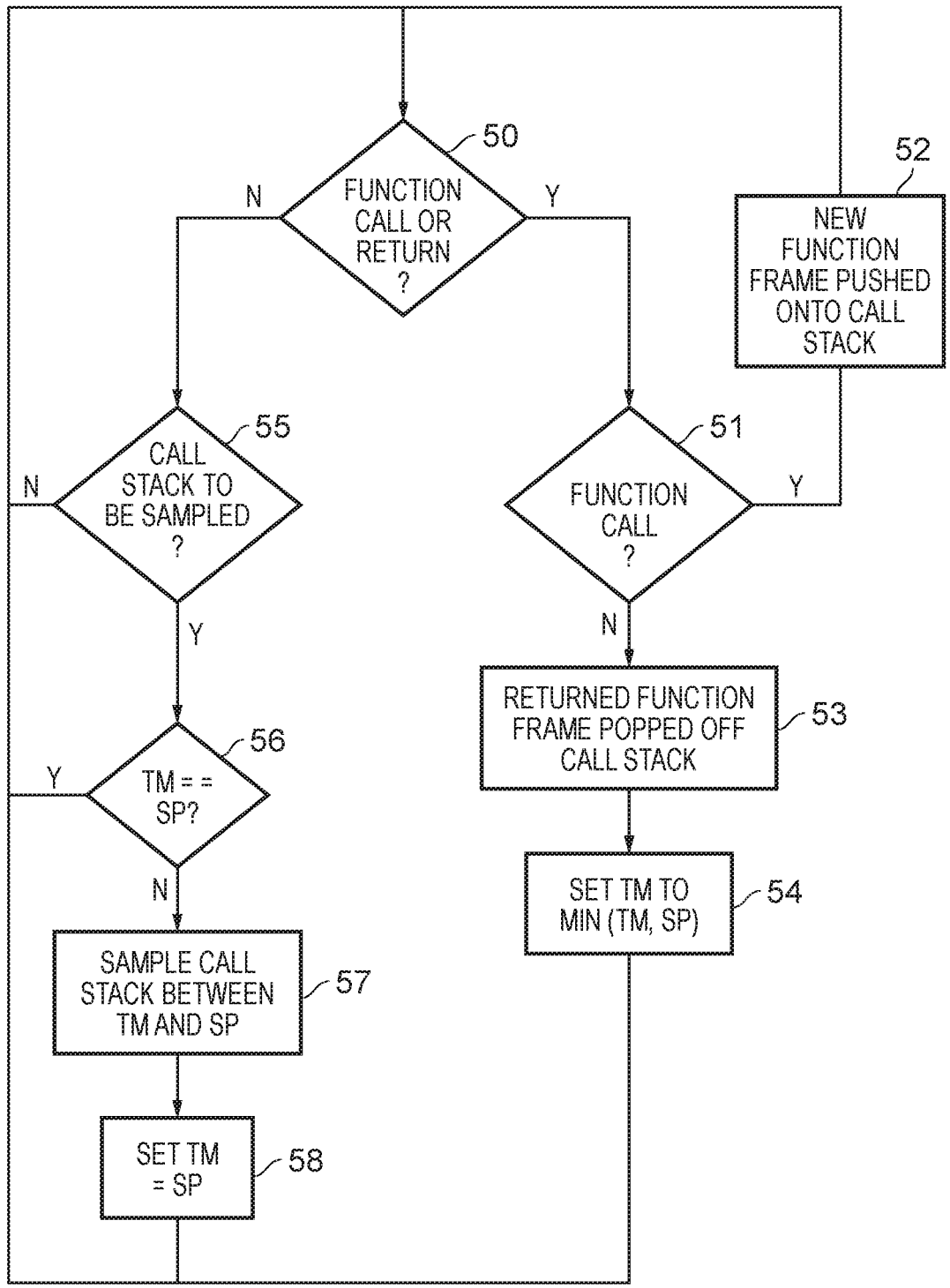
FIG. 3 is a flow diagram showing a sequence of steps which are taken according to the method of one embodiment when maintaining and sampling a call stack.

FIG. 3 is a flow diagram showing steps which are taken according to the method of one example embodiment. The flow can be considered to begin at step 50, where it is determined if a function (subroutine) has been called or has returned. If this is the case then the flow proceeds to step 51 where it is determined if this is a function (subroutine) call. If it is then the flow proceeds to step 52 where a new stack frame corresponding to this new function call is pushed onto the call stack. It will be understood that this results in the stack pointer SP now indicating this newly added stack frame. The flow will then return to step 50. Returning to a consideration of step 51, if this is not a function call then it is a return and the flow proceeds to step 53 where the returned function frame is popped off the top of the call stack. It will be understood that this popping of the frame from the call stack also causes the stack pointer to be reset to indicate the new top of the remaining call stack. Then at step 54 if necessary the tide mark pointer is also updated, in that it is set to the minimum of its current value and the updated stack pointer value. The flow then returns to step 50. When at step 50 it is determined that neither a function call nor a function return has occurred then the flow proceeds to step 55 where it is determined if a sampling of the call stack is to be carried out. If this is not the case then the flow simply returns to step 50. However, when a call stack sampling is to be carried out then the flow proceeds to step 56 where it is firstly determined if the tide mark pointer value matches that of the stack pointer. If it does then this indicates that the call stack has not changed since it was last sampled, and since no further call stack sampling is needed to be carried out the flow simply returns to step 50. However if this is not the case then the flow proceeds to step 57 where the call stack is sampled between the levels indicated by the stack pointer and the tide mark pointer. Then at step 58 the tide mark pointer is set to the current value of the stack pointer. The flow then returns to step 50.

Figure 4A:
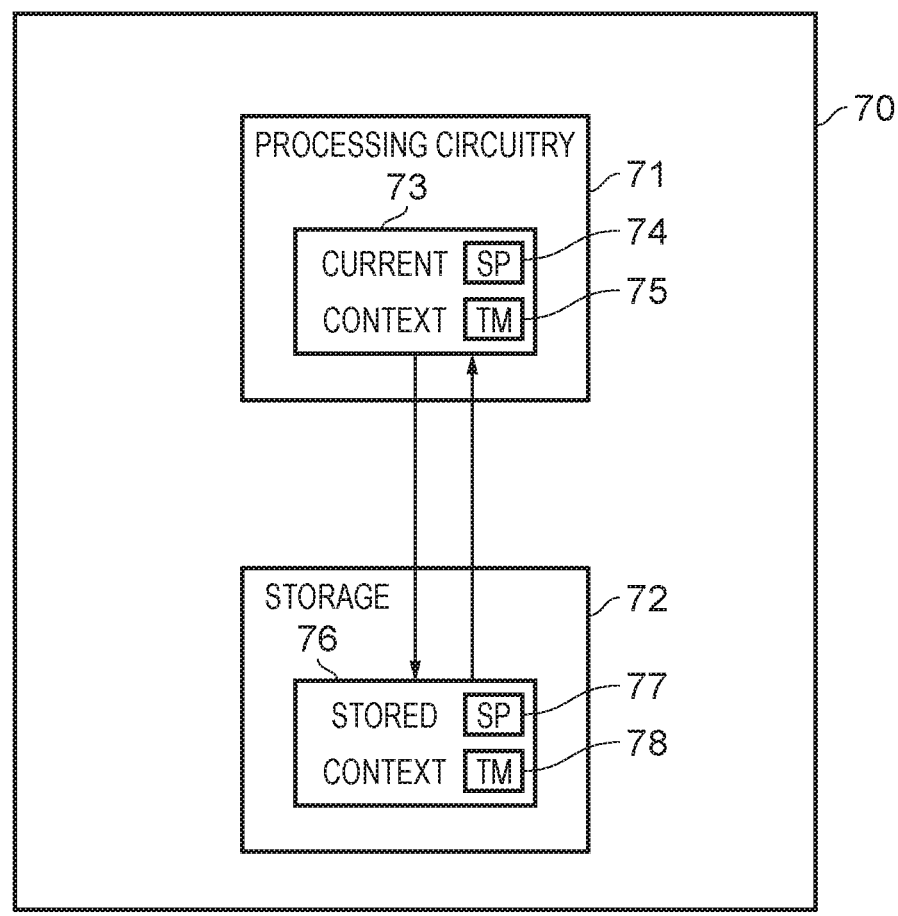
FIG. 4A schematically illustrates a data processing apparatus in one example embodiment in which software multithreading takes place and context for a current thread can be replaced by a different context in order to switch to a new thread.

FIG. 4A schematically illustrates an apparatus 17 in one example embodiment. The processing circuitry 71 is software multi-threaded and accordingly can switch between multiple software threads. Each software thread has an associated context (defining various aspects of the state of the data processing apparatus) and as shown in FIG. 4A the current context 73 for the currently executing software thread can be seen to comprise the stack pointer value 74 as well as the tide mark pointer value 75. Hence, when the processing circuitry 71 switches software threads, the current context 73 is saved and exported to be stored in storage 72, whilst a stored context 76 (comprising stored values of the stack pointer value 76 and the tide mark pointer value 78) saved in a storage 72 is imported for the software thread to which the processing circuitry is switching. An alternative approach when switching to a different software thread if for the current value of the tide mark pointer to simply be invalidated or reset (referring to FIGS. 2A and 2B being set to the zero level), which does not functionally affect the data processing operations which the processing circuitry carries out, but when the call stack is next sampled the entire call stack will require sampling. When the tide mark pointer value is maintained as part of the context of a thread it may also be transferred in and out of the processing circuitry according to any context switch mechanisms e.g. banked registers or lazy loading of context from memory.

Figure 4B:
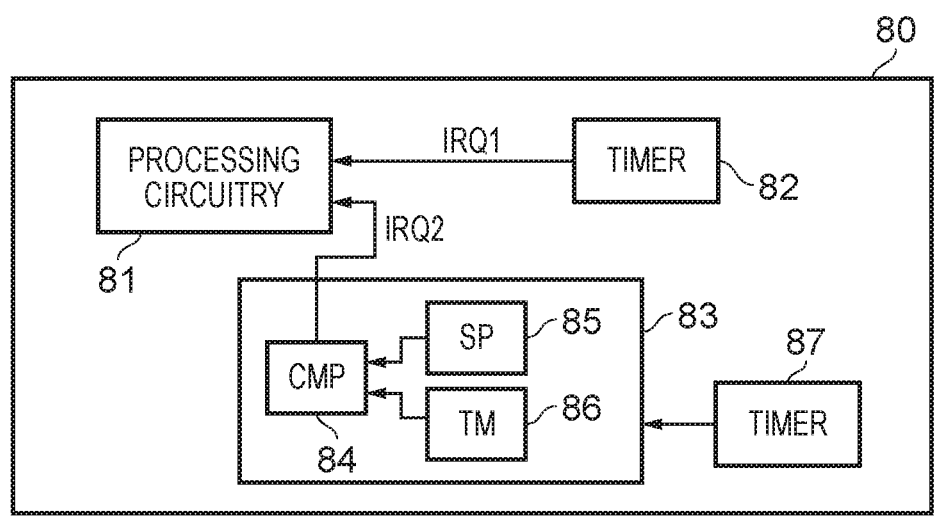
FIG. 4B schematically illustrates an apparatus in one example embodiment in which a call stack sampling procedure can be triggered by an interrupt generated by a timer or by an interrupt generated by a comparison of a stack pointer and a tide mark pointer.

FIG. 4B schematically illustrates an apparatus 80 in one example embodiment. In particular, FIG. 4B schematically illustrates two example mechanisms by which the processing circuitry may be caused to perform the call stack sampling procedure. As shown in FIG. 4B the apparatus 80 comprises the processing circuitry 81 and a timer 82. The timer 82 can be set to a suitable interval for the call stack sampling to be carried out and generates an interrupt at the appropriate frequency. On receipt of the interrupt IRQ1 from the timer 82 the processing circuitry 81 can perform the call stack sampling procedure. Also as shown in FIG. 4B (although it should be noted that both mechanisms may be present, or only one of them may be present) is call stack monitoring circuitry 83 which comprises comparison circuitry 84. The comparison circuitry 84 receives the value of the stack pointer 85 and the value of the tide mark pointer 86. On the basis of a comparison of these values the comparison circuitry 84 can generate an interrupt IRQ2 for the processing circuitry 81, in order to cause it to carry out the call stack sampling procedure. The configuration of the comparison circuitry 84 can for example be set so that when the stack pointer value 85 exceeds the value of the tide mark pointer 86 (see for example FIGS. 2A and 2B) then sampling of the call stack is triggered. Note also that the call stack monitoring circuitry 83 may also receive an input from a timer 87, such that the comparison between SP and TM is not continually carried out, but the two are compared at predetermined intervals.

Figure 5:
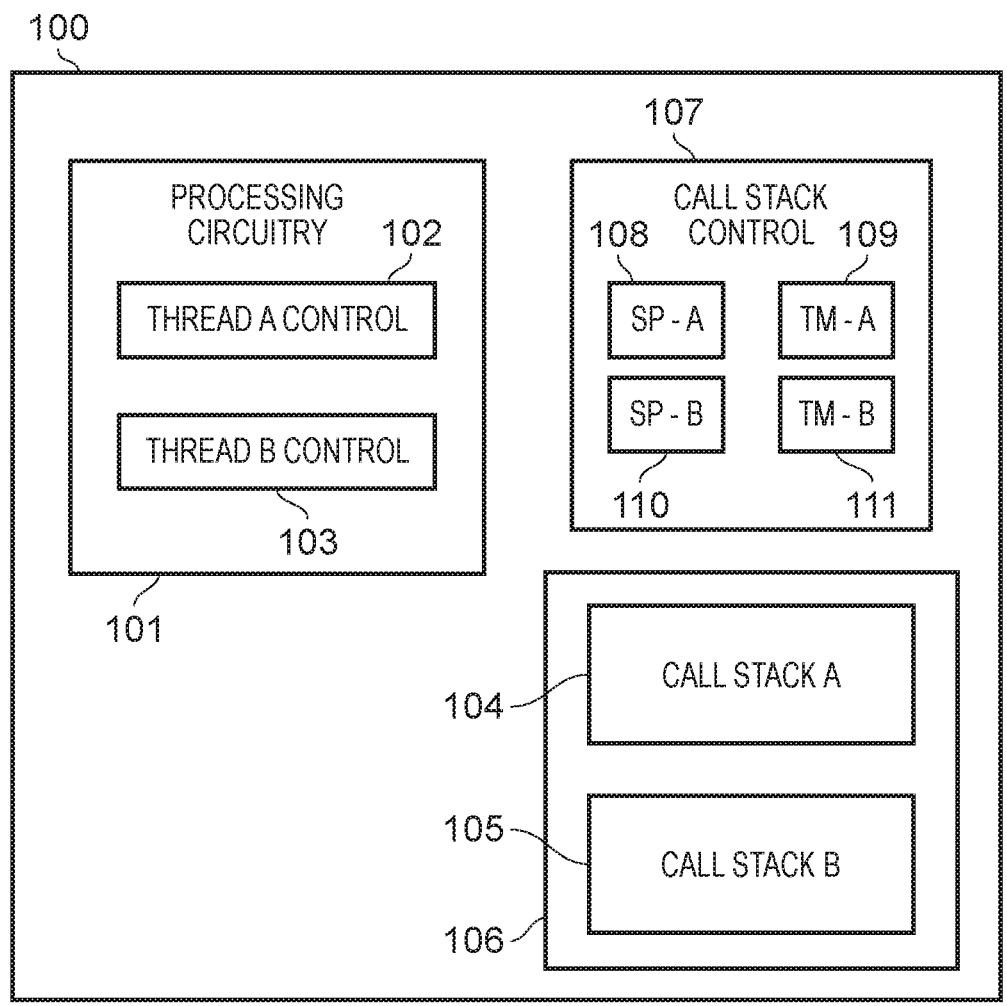
FIG. 5 schematically illustrates an apparatus in one example embodiment in which processing circuitry is hardware multi-threaded and the apparatus is arranged to maintain stack pointers and tide mark pointers for each call stack it maintains for each thread.

FIG. 5 schematically illustrates an apparatus 100 in one example embodiment. Here the processing circuitry 101 is hardware multi-threaded and accordingly comprises individual hardware control for multiple threads. This is represented in FIG. 5 by thread A control 102 and thread B control 103. Only two hardware threads are illustrated for simplicity of illustration. Correspondingly two call stacks 104 and 105 are maintained in the storage 106, and the call stack control circuitry 107 maintains a stack pointer value 108 and a tide mark pointer value 109 as well as a stack pointer value 110 and a tide mark pointer value 111, corresponding to the respective call stacks.

Figures 6A, 6B:
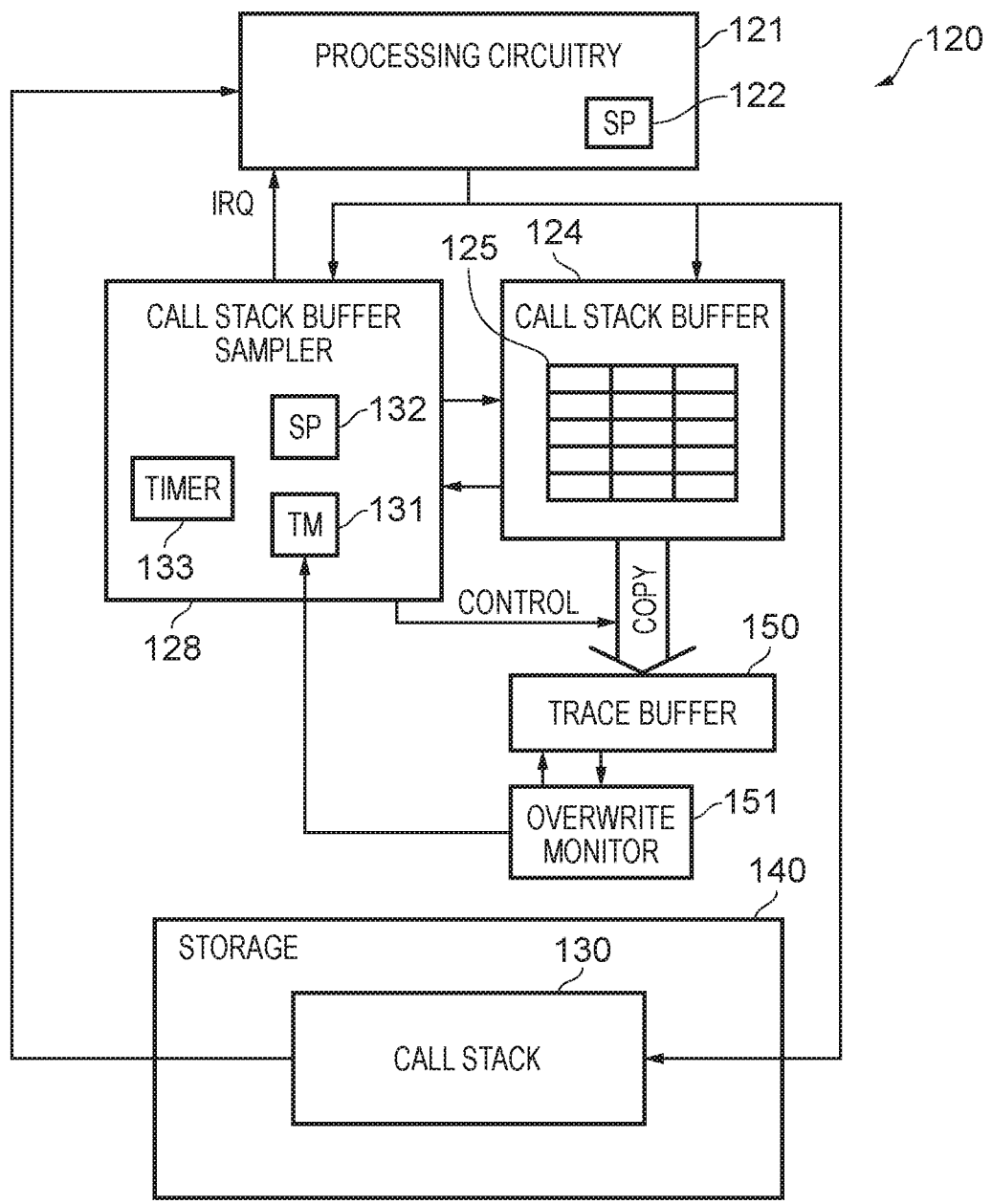
FIG. 6A schematically illustrates an apparatus in one example embodiment which comprises a call stack buffer.
FIG. 6B schematically illustrates the content of a call stack buffer in one example embodiment.

FIG. 6A schematically illustrates an apparatus 120 in one example embodiment. The apparatus comprises processing circuitry 121 which performs data processing operations and makes use of a call stack data structure 130, stored in storage 140, when performing its data processing operations. The processing circuitry maintains a stack pointer 122 with reference to the call stack 130. The apparatus 120 also comprises a call stack buffer 124 in which a fixed number of records 125 can be stored, each comprising, as shown in FIG. 6B, a source address, a target address and a stack pointer value. The call stack buffer 124 is updated by call and return instructions. Also updating the stack pointer (e.g. on a software exception unwind which pops multiple calls) causes any call stack buffer records with a younger (higher) stack pointer value to be discarded. The apparatus 120 further comprises a call stack buffer sampler 128, which is arranged to control a copying process which copies content from the call stack buffer 128 to a trace buffer 150. The content of the trace buffer 150 is exported periodically or in response to a particular signal. The call stack buffer sampler 128 maintains a tide mark pointer value 131 and a stack pointer value 132 (this being a copy of the stack pointer 122 maintained by the processing circuitry 121). The call stack buffer sampler 128 further comprises a timer 133 which triggers the call stack buffer sampler to copy content of the call stack buffer 124 into the trace buffer 150 at predetermined intervals. When performing the copying from the call stack buffer 124 to the trace buffer 150 the call stack buffer sampler compares the stack pointer values of the records to the tide mark pointer value 131 which it maintains and it is configured to stop the copying process when the next record it examines in the call stack buffer 124 corresponds to an older subroutine than that indicated by the tide mark value 131. Viewed in terms of the call stacks shown in FIGS. 2A and 2B, this would correspond to a stack pointer level below the level at which the tide mark pointer value 131 currently indicates. However, if the copying process concludes and the oldest record in the call stack buffer 124 (i.e. that with a stack pointer value lowest in the representations of FIGS. 2A and 2B) has a stack pointer value above the tide mark pointer value 131, this indicates that there is a gap between the content available in the call stack buffer 124 and the portion of the call stack 130 for which sampling has previously been performed. In this case software needs to unwind the call stack and the call stack buffer sampler generates an interrupt IRQ in order to cause the processing circuitry 121 to be interrupted to do this. Once this is completed an accurate record of the call stack has been made from the youngest record in the call stack buffer downwards and thereafter the tide mark pointer value 131 is set to the current stack pointer value SP. Apparatus 120 further comprises a trace buffer overwrite monitor 151 which monitors the usage of the trace buffer 150, and in particular identifies when content of the trace buffer which has not yet been exported is overwritten. In this situation it signals to the call stack buffer sampler 128 and the tide mark pointer 131 is reset (i.e. zeroed in the representations of FIGS. 2A and 2B) such that a full call stack unwind will be performed at the next sampling point in order to recapture this information.

Figure 7:
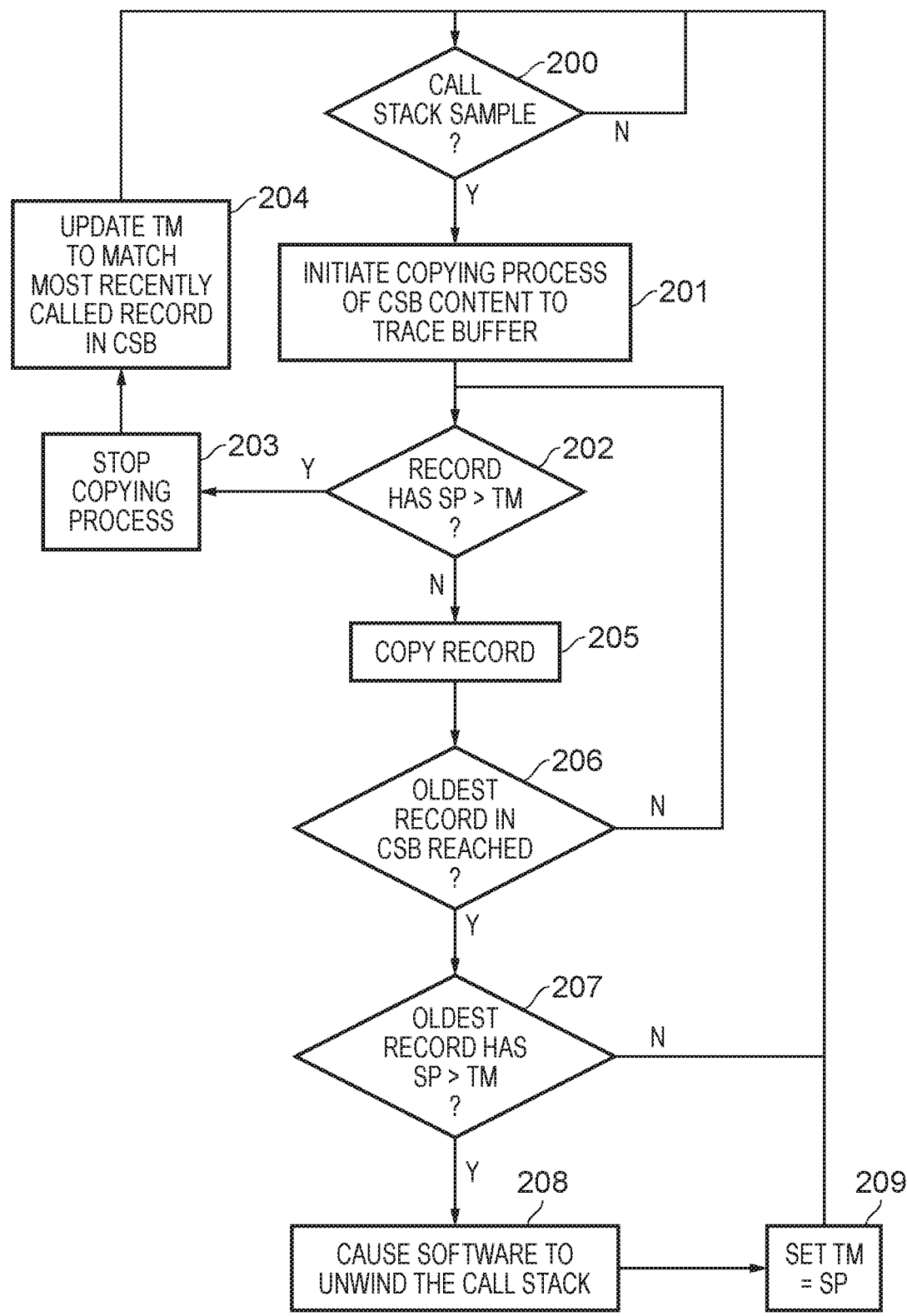
FIG. 7 is a flow diagram showing a sequence of steps which are taken according to the method of one example embodiment when a call stack sampling procedure is carried out.

FIG. 7 is a flow diagram showing a sequence of steps which are carried out in the method of an example embodiment, for example as may be carried out within the apparatus 120 of FIG. 6A. The flow can be considered to begin at step 200 where it is determined if a call stack sample is required. Whilst it is not the flow waits at this point. When a call stack sample is to be performed the flow proceeds to step 201, where a copying process to copy the content of the call stack buffer to the trace buffer is initiated. Next at step 202 it is determined if the first record encountered has a stack pointer value greater than the current tide mark pointer value. If it does then the flow proceeds to step 203 and the copying process is stopped and at step 204 the tide mark pointer value is updated to match the most recently called record stored in the call stack buffer. The flow then returns to step 200. Returning to a consideration of step 202 if this condition is not true then the record is copied, at step 205, from the call stack buffer to the trace buffer. Then at step 206 it is determined if the oldest record in the call stack buffer had been reached. If not then the flow returns to step 202. If however the oldest record in the call stack buffer had been reached then at step 207 it is determined if this oldest record has a stack pointer value greater than that of the current tide mark pointer value. If this is not the case then the flow returns to step 200. Otherwise if at step 207 this is true then the flow proceeds to step 208 where the software is caused to unwind the full call stack (in order to cover this gap) and then at step 209 the tide mark pointer is set to the current value of the stack pointer. The flow then returns to step 200.

Figure 8:
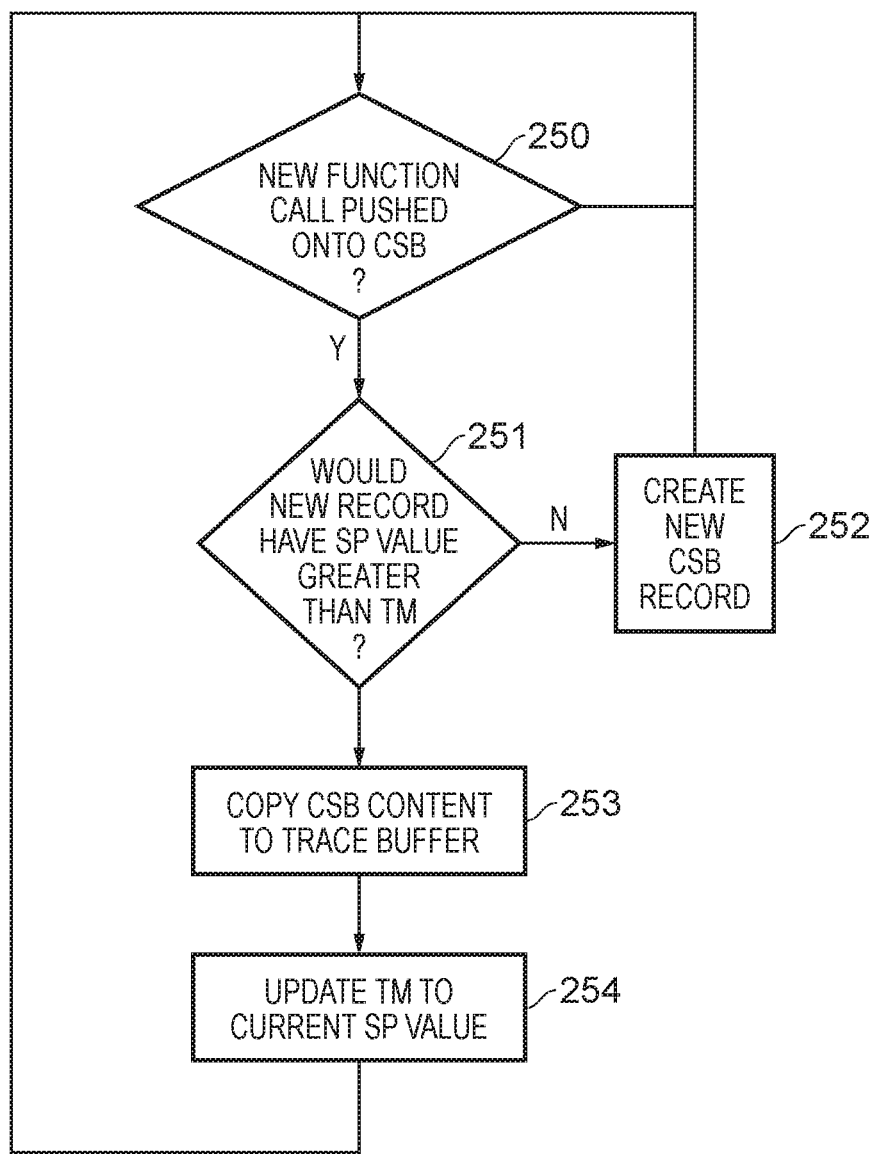
FIG. 8 is a flow diagram showing a sequence of steps which are carried out according to the method of one example embodiment when maintaining a call stack buffer.

FIG. 8 is a flow diagram showing a sequence of steps which taken according to the method of one embodiment, which for example may be performed by the apparatus 120 in FIG. 6A. The flow can be considered to begin at step 250, where it is determined if there is a new function call to be pushed onto the call stack buffer. The flow waits at this point until this is the case. When this is true then the flow proceeds to step 251 where it is determined if creating this new record in the call stack buffer would result in the new record having a stack pointer value greater than the current value of the tide mark pointer. If this is not the case then the flow proceeds to step 252 and the new call stack buffer record is created and the flow returns to step 250. If however, this condition is true then the flow proceeds to step 253 where the content of the call stack buffer is caused to be copied to the trace buffer and at step 254 the tide mark pointer is updated to the current stack pointer value. This method and approach means that subsequently when the call stack sampling trigger occurs and a call stack sample is required, the trace buffer already has the captured call stack content up to this point and there is no need to interrupt the software to unwind the stack. It is to be noted that a delay may be introduced into the flow steps of FIG. 8 in order to avoid heavily nested code (i.e. code that repeatedly performs lots of calls followed by lots of returns) causing more pre-emptive traces than are required.

In brief overall summary, apparatuses and methods of their operation are disclosed. A call stack is maintained which comprises subroutine information relating to subroutines which have been called during data processing operations and have not yet returned. A stack pointer is indicative of an extremity of the call stack associated with a most recently called subroutine which has been called during the data processing operations and has not yet returned. Call stack sampling can be carried out with reference to the stack pointer. A tide mark pointer is maintained, which indicates of a value which the stack pointer had when the call stack sampling procedure processing circuitry was last completed. The call stack sampling procedure comprises retrieving subroutine information from the call stack indicated between the value of the tide mark pointer and the current value of the stack pointer. More efficient call stack sampling is thereby supported, in that only modifications to the call stack need be sampled.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
processing circuitry to perform data processing operations, wherein the data processing operations comprise subroutines;
call stack storage to store a call stack comprising subroutine information relating to subroutines which have been called during the data processing operations and have not yet returned;
stack pointer storage to store a stack pointer, wherein a current value of the stack pointer is indicative of an extremity of the call stack associated with a most recently called subroutine which has been called during the data processing operations and has not yet returned,
wherein the processing circuitry is responsive to a call stack sampling trigger to perform a call stack sampling procedure comprising accessing the call stack with reference to the stack pointer,
and tide mark pointer storage to store a tide mark pointer, wherein a value of the tide mark pointer is indicative of a previous value which the stack pointer had when the processing circuitry last completed the call stack sampling procedure,
wherein the processing circuitry is arranged to perform the call stack sampling procedure comprising retrieving subroutine information indicated between the value of the tide mark pointer and the current value of the stack pointer,
wherein the tide mark pointer storage is responsive to performance of the call stack sampling procedure to modify the tide mark pointer to match the current value of the stack pointer,
and wherein tide mark pointer storage is responsive to removal of subroutine information from the call stack to modify the tide mark pointer to match the current value of the stack pointer resulting from the removal of subroutine information from the call stack.

2. The apparatus as claimed in claim 1, wherein the tide mark pointer storage is responsive to execution of a subroutine return instruction which causes the current value of the stack pointer to correspond to a less recently called subroutine than indicated by the value of the tide mark pointer to modify the tide mark pointer to match the current value of the stack pointer.

3. The apparatus as claimed in claim 1, wherein the tide mark pointer storage is responsive to a write to the stack pointer which causes the current value of the stack pointer to correspond to a less recently called subroutine than indicated by the value of the tide mark pointer to modify the tide mark pointer to match the current value of the stack pointer resulting from the write to the stack pointer.

4. The apparatus as claimed in claim 1, wherein the call stack sampling trigger is reception of a predetermined call stack sampling interrupt.

5. The apparatus as claimed in claim 4, wherein the tide mark pointer storage and the stack pointer storage are arranged to cooperate to generate the predetermined call stack sampling interrupt when the current value of the stack pointer indicates a stack pointer position in the call stack corresponding to a more recently called subroutine than a tide mark position in the call stack indicated by the value of the tide mark pointer.

6. The apparatus as claimed in claim 1, wherein the call stack sampling trigger is elapse of a predetermined time period.

7. The apparatus as claimed in claim 1, wherein the processing circuitry is software multi-threaded and, when performing a thread switch from a first thread to a second thread, is arranged to export thread context for the first thread comprising a first thread value of the tide mark pointer and to import thread context for the second thread comprising a second thread value of the tide mark pointer for the second thread.

8. The apparatus as claimed in claim 1, wherein the processing circuitry is software multi-threaded and, when performing a thread switch from a first thread to a second thread, is arranged to invalidate a first thread value of the tide mark pointer and set to a default value a second thread value of the tide mark pointer for the second thread.

9. The apparatus as claimed in claim 1, wherein the processing circuitry is hardware multi-threaded,
wherein the call stack storage is capable of storing a set of per-thread call stacks,
wherein the stack pointer storage is capable of storing a set of per-thread stack pointers,
and wherein the tide mark pointer storage is capable of storing a set of per-thread tide mark pointers.

10. The apparatus as claimed in claim 1, further comprising:
a call stack buffer to store records, each record comprising:
a source address and a target address for a subroutine which has been called during the data processing operations and has not yet returned; and
a record value of the stack pointer at a timepoint when the record was created;
a trace buffer to store trace data for export from the apparatus; and
call stack buffer sampling circuitry responsive to a call stack buffer sampling trigger to perform a record copying process comprising copying stored records in the call stack buffer to the trace buffer.

11. The apparatus as claimed in claim 10, wherein when performing the record copying process the call stack buffer sampling circuitry is responsive to reaching a record for which the record value of the stack pointer indicates a stack pointer position in the call stack corresponding to a less recently called subroutine than a tide mark position in the call stack indicated by the value of the tide mark pointer to conclude the record copying process and to update the tide mark pointer to indicate a most recently called subroutine indicated in the call stack buffer.

12. The apparatus as claimed in claim 10, wherein when performing the record copying process the call stack buffer sampling circuitry is responsive to reaching an oldest record in the call stack buffer corresponding to a least recently called subroutine having a record in the call stack buffer, when the record value for the oldest record indicates a stack pointer position in the call stack corresponding to a more recently called subroutine than a tide mark position in the call stack indicated by the value of the tide mark pointer, to cause the processing circuitry to perform the call stack sampling procedure.

13. The apparatus as claimed in claim 10, wherein the call stack buffer sampling circuitry is arranged to cause the processing circuitry to perform the call stack sampling procedure by issuing a call stack sampling interrupt.

14. The apparatus as claimed in claim 10, wherein the call stack buffer is responsive to modification of the value of the stack pointer to discard records for which the record value of the stack pointer indicates a stack pointer position in the call stack corresponding to a more recently called subroutine than a stack pointer position in the call stack indicated by the modified value of the stack pointer.

15. The apparatus as claimed in claim 10, wherein the call stack buffer sampling circuitry is responsive to a new subroutine call, when creation of a new record for the new subroutine call would result in the new record having the record value of the stack pointer indicating a stack pointer position in the call stack corresponding to a more recently called subroutine than the tide mark position in the call stack indicated by the value of the tide mark pointer, to perform the record copying process and to update the value of the tide mark pointer to a current value of the stack pointer.

16. The apparatus as claimed in claim 15, wherein the call stack buffer sampling circuitry is arranged to perform the record copying process further dependent on a predefined call stack buffer copying timing interval.

17. The apparatus as claimed in claim 10, wherein the trace buffer is responsive to a trace buffer overwrite, wherein the trace buffer overwrite causes unexported trace data to be overwritten, to cause the value of the tide mark pointer to be set to correspond to a stack pointer position indicative of an oldest position in the call stack.

18. The apparatus as claimed in claim 10, wherein the trace buffer is responsive to a trace buffer overwrite, wherein the trace buffer overwrite causes unexported trace data to be overwritten, to cause the tide mark pointer to be invalidated.

19. A method of data processing comprising:
  performing data processing operations, wherein the data processing operations comprise subroutines;
  storing a call stack comprising subroutine information relating to subroutines which have been called during the data processing operations and have not yet returned;
  storing a stack pointer, wherein a current value of the stack pointer is indicative of an extremity of the call stack associated with a most recently called subroutine which has been called during the data processing operations and has not yet returned;
  performing a call stack sampling procedure comprising accessing the call stack with reference to the stack pointer in response to a call stack sampling trigger;
  storing a tide mark pointer, wherein a value of the tide mark pointer is indicative of a previous value which the stack point had when the call stack sampling procedure was last completed;
  modifying the tide mark pointer to match a modified value of the stack pointer in response to performance of the call stack sampling procedure; and
  modifying the tide mark pointer to match the current value of the stack pointer resulting from the removal of subroutine information from the call stack,
  wherein performing the call stack sampling procedure comprises retrieving subroutine information indicated between the value of the tide mark pointer and the current value of the stack pointer.

20. Apparatus comprising:
  means for performing data processing operations, wherein the data processing operations comprise subroutines;
  means for storing a call stack comprising subroutine information relating to subroutines which have been called during the data processing operations and have not yet returned;
  means for storing a stack pointer, wherein a current value of the stack pointer is indicative of an extremity of the call stack associated with a most recently called subroutine which has been called during the data processing operations and has not yet returned;
  means for performing a call stack sampling procedure comprising accessing the call stack with reference to the stack pointer in response to a call stack sampling trigger;
  means for storing a tide mark pointer, wherein a value of the tide mark pointer is indicative of a previous value which the stack point had when the call stack sampling procedure was last completed;
  means for modifying the tide mark pointer to match a modified value of the stack pointer in response to performance of the call stack sampling procedure; and
  means for modifying the tide mark pointer to match the current value of the stack pointer resulting from the removal of subroutine information from the call stack,
  wherein performing the call stack sampling procedure comprises retrieving subroutine information indicated between the value of the tide mark pointer and the current value of the stack pointer.

* * * * *